Figure 1:
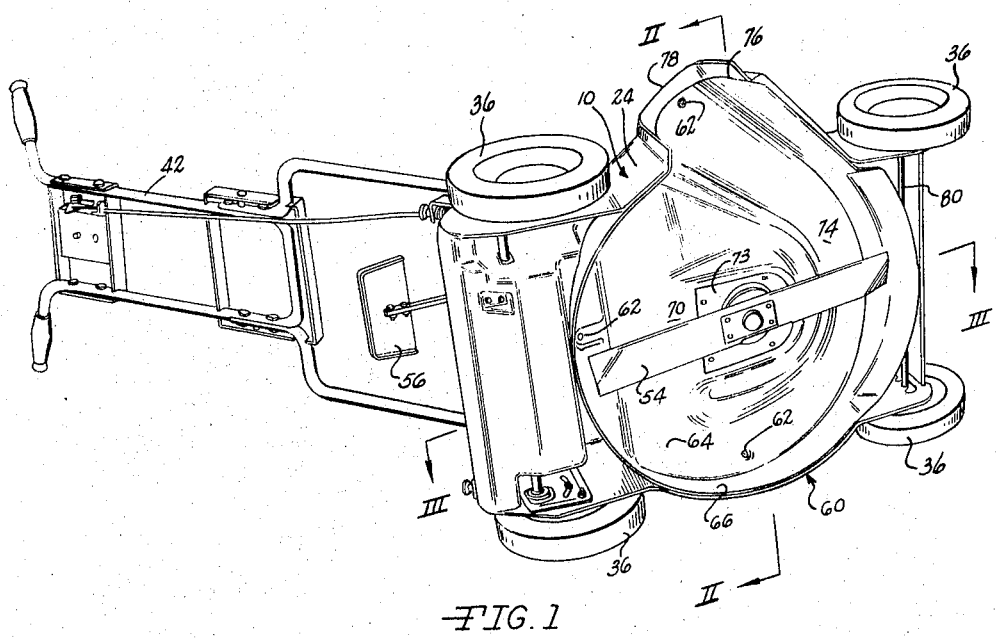

Jan. 24, 1967  R. A. HANSON ETAL  3,299,622
ROTARY DISC MOWER WITH SEPARATE FRAME
AND BLADE HOUSING STRUCTURE
Filed Sept. 3, 1965  2 Sheets-Sheet 1

INVENTORS
RUDOLPH A. HANSON
FRANK J. DEPTULA

ATTORNEYS

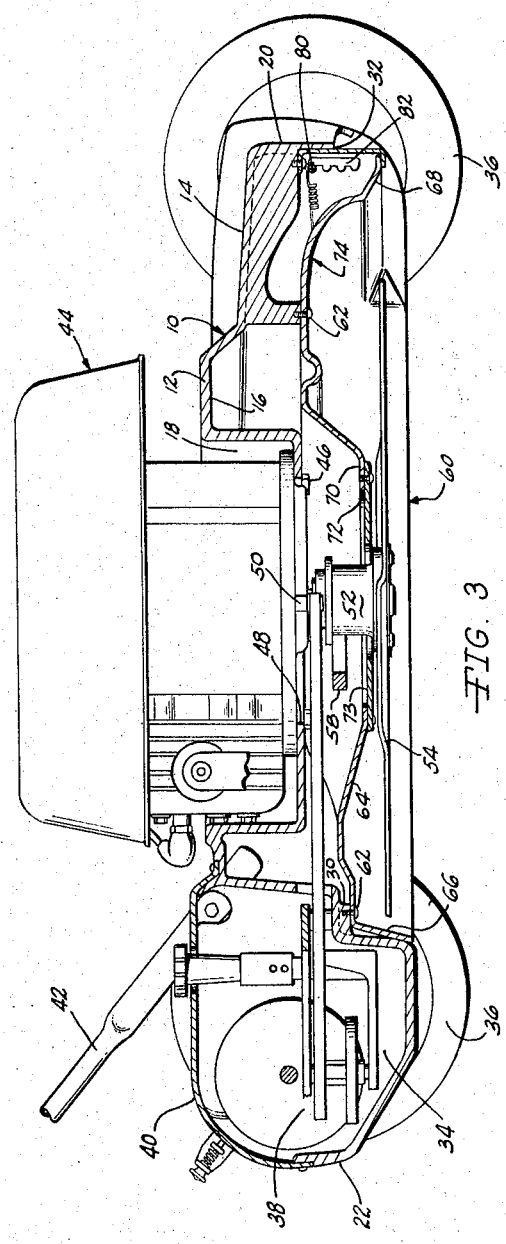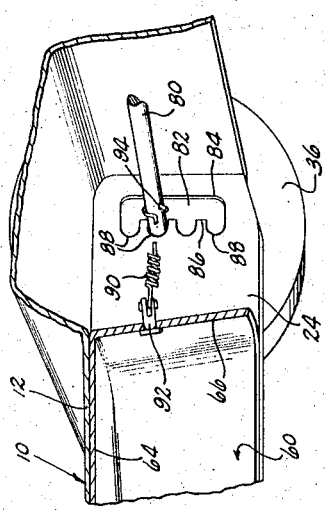

United States Patent Office 3,299,622
Patented Jan. 24, 1967

3,299,622
ROTARY DISC MOWER WITH SEPARATE FRAME AND BLADE HOUSING STRUCTURE
Rudolph A. Hanson and Frank J. Deptula, Jackson, Mich., assignors to Yard-Man, Inc., Jackson, Mich., a corporation of Michigan
Filed Sept. 3, 1965, Ser. No. 484,848
9 Claims. (Cl. 56—25.4)

The invention pertains to lawn mower structure, and particularly pertains to a rotary lawn mower construction wherein cutting is produced by an elongated blade rotating about a vertical axis.

The so-called "rotary" lawn mower wherein an elongated cutting blade rotates about a vertical axis has been popularly received in recent years, and a wide variety of lawn mower constructions using this type of cutting blade are currently available on the commercial market. Rotary lawn mowers basically consist of a frame supported by a plurality of ground wheels. An engine is mounted upon the frame and, in most cases, the engine crankshaft is arranged in a vertical manner having a lower end which extends below the frame to which the blade is attached. The ground wheels may or may not be powered by the engine, and a handle fixed to the frame is used for guiding and pushing in nonself propelled embodiments. The circular area described by the rotating blade is usually rather closely confined by the frame for two primary reasons. First, as the rotating blade will "throw" rocks sticks, wire, nails, and other foreign objects encountered by the blade, close confinement of the blade is desirable from a safety standpoint. Second, considerable air turbulence is created by the blade and, rotary blades often include vane portions adapted to create a suction to draw the grass into the path of blade movement. By shaping the frame in the area of the blade, the flow of air within the frame can be regulated to some extent to produce desired cutting, mulching, and cutting discharge pattern characteristics.

It has been common practice in rotary lawn mower construction to form the blade housing or shroud as an integral part of the mower frame. In such a construction, the motor is usually bolted directly upon the blade housing or shroud portion of the frame, and the configuration of the blade housing is exteriorly apparent as to form a portion of the mower frame appearance and configuration. In heretofore known rotary mower constructions, the frame blade housing integral construction is usually formed by a casting process or from pressed or formed sheet metal, such as sheet steel. Cast frame blade housing constructions are desirable from the attractive appearance possible with a cast construction and a high degree of rigidity can be obtained, whereby a strong solid mower may be produced. However, cast frame blade housing constructions have the disadvantage of being relatively expensive and susceptible to damage. Particularly, cast housing are susceptible to damage incurred by hard foreign objects, such as rocks, being thrown by the blade against the blade housing. As the cast construction is rather brittle, thrown stones and rocks often break or crack cast frames.

Mowers incorporating a pressed or formed sheet steel frame blade housing can be economically produced, and the steel blade housing portion provides good resistance against damage being inflicted thereto by foreign objects thrown by the blade. However, pressed steel mower constructions do not have the rigidity of the cast construction, are more subject to fatigue failure, and usually do not have the more attractive and aesthetic appearance of the cast construction.

It is an object of the invention to provide a lawn mower construction which utilizes the advantageous characteristics of both the cast and formed or pressed sheet metal constructions. In the practice of the invention, the basic frame of the mower is of a cast construction, whereby a rigid and attractive appearance can be provided. The shape of the cast frame can be solely determined by that shape which is most desirable for the accommodation of the wheels, motor and other associated apparatus, and need not include the heretofore required consideration relative to the blade housing or shroud portion of the mower. The blade housing or shroud is formed of a pressed steel construction which is affixed to the underside of the cast frame. Thus, rocks and foreign matter thrown by the blade are deflected and confined by the pressed blade housing construction, and no damage is inflicted upon the cast frame. The desired air guide channels and convolutions may be readily formed in the pressed sheet metal blade housing, and the blade housing completely separates the area of blade movement from the frame. The use of the formed blade housing minimizes the amount of metal required in the cast frame construction and, yet, permits an attractive mower configuration to be provided which need not be determined by the shape and functional characteristics of the blade housing.

It is therefore, a basic object of the invention to provide a mower construction incorporating the advantages of a cast frame construction and a formed steel or sheet metal blade housing.

A further object of the invention is to provide a rotary lawn mower construction wherein the frame and blade housing are separate members which are interconnected by removable fasteners.

Another object of the invention is to provide a rotary lawn mower construction employing separate frame and blade housing components whereby the blade housing completely confines the area of blade movement relative to the frame and protects apparatus mounted upon the mower above the blade housing from the cutting area.

A further object of the invention is to provide a rotary lawn mower construction wherein the appearance and styling of the lawn mower need not be primarily determined by the desired configuration of the blade housing or shroud, yet optimum safety and cutting characteristics are provided in a lightweight and durable manner.

A further object of the invention is to provide an economical and easily operable height adjustment for the wheels of a rotary lawn mower.

These and other objects of the invention arising from the details and relationships of the components of an embodiment thereof will be apparent from the following description and accompanying drawing wherein.

Figure 2:
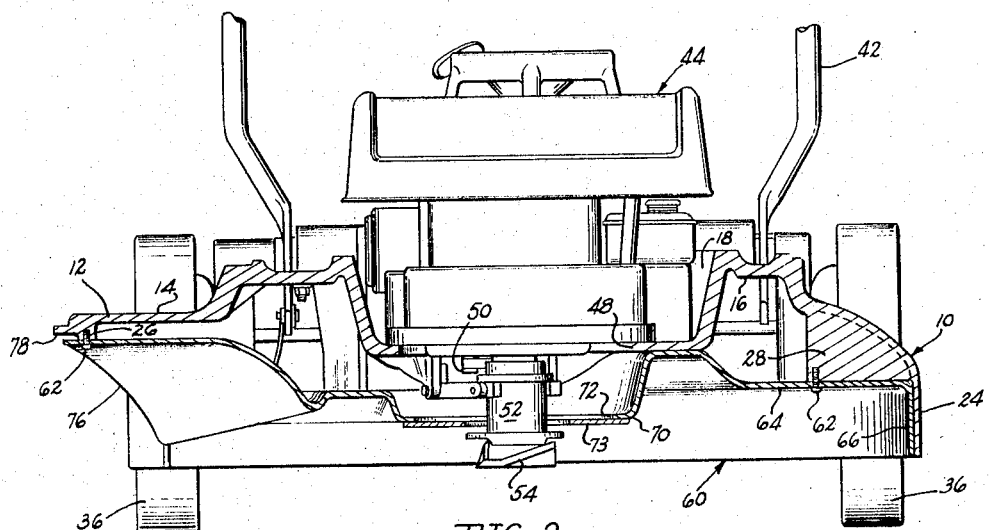

FIG. 1 is an underside, perspective view of a self-propelled lawn mower incorporating the inventive concepts of the invention, FIG. 2 is an elevational, sectional view of the lawn mower of FIG. 1, as taken along section II—II thereof, FIG. 3 is an elevational, sectional view of the lawn mower of FIG. 1 taken in the longitudinal direction along section III—III thereof, and FIG. 4 is an enlarged detail, cutaway, perspective view of the wheel adjustment of the invention.

A lawn mower practicing the concepts of the invention includes a frame 10 formed of a cast material, preferably, an aluminum alloy. The frame includes an upper portion or deck 12 having an upper surface 14 and a lower surface 16. It will be appreciated from FIGS. 2 and 3 that the configuration of the deck includes a motor-receiving recess 18 in the central region thereof. The front of the frame is represented at 20 and the rear is represented at 22. The lateral portions of the frame are defined by lateral sides 24 depending from the deck 12, which depend substantially in the vertical direction when the mower is in its normal operating position. The underside of the deck 12 is provided with bosses such as at 26, 28 and 30 which serve as locating surfaces for the blade housing or shroud, as will be later described. At the front, the lowermost portion of the frame 10 terminates at 32, FIG. 3, and, in the illustrated embodiment, self-propelling mechanism is located within the chamber forming frame portion 34 at the rear thereof.

A plurality of ground wheels 36 support the mower and, preferably, are mounted for vertical adjustment relative to the frame in order to vary the height of the cutting action performed by the blade. The rear wheels 36 are powered through a friction drive mechanism 38 which forms no part of the present invention, and is described in detail in our copending United States application Serial No. 484,800, filed September 3, 1965. A cover plate 40 is affixed to the housing portion 34 whereby the wheel drive mechanism may be completely enclosed.

A handle 42 is povotally mounted upon the frame 10 and may include a throttle control cable. As described in the aforementioned application, the handle 42 is operatively connected to the drive means 38 whereby clutching of the drive means is controlled by the handle position.

A small internal combustion engine 44 is mounted on the frame 10 by bolts 46, FIG. 3. The engine 44 is of the usual type, having a vertically disposed crankshaft which has a lower end on which the cutting blade is mounted. As will be best appreciated from FIGS. 2 and 3, the recess 18 defined at the central region of the frame closely receives the engine 44 wherein the vertical extension of the motor above the frame deck is minimized. An opening 48 defined in the deck 12 permits the lower end of the crankshaft to extend below the deck and, also, provides clearance for the camshaft extension 50, which is used as a power take-off to drive the wheel drive means 38.

In the disclosed embodiment, a blade clutch mechanism 52 is mounted on the lower end of the engine crankshaft and has an elongated cutting blade 54 affixed thereto. By means only generally shown, including a foot lever 56 and a connecting operating yoke arm 58, the blade clutch mechanism 52 is adapted to operatively clutch and declutch the blade 54 with respect to the engine drive shaft. The details of the blade clutch mechanism are disclosed in detail in our aforementioned United States application Serial No. 484,800. For the purposes of this application, the clutch 52 and the camshaft extension 50 are hereinafter referred to as power transmission apparatus.

A blade housing or shroud 60 is affixed to the central region of the frame 10 below the deck as to be superimposed over the area of blade movement. The blade housing 60 is, preferably, constructed of pressed or formed sheet metal steel, and is provided in its upper wall with a plurality of holes to receive threaded fasteners 62. The frame bosses 26, 28 and 30 are provided with threaded holes to receive the fasteners 62 which extend through the blade housing holes. In this manner, the bosses orient the blade housing relative to the frame.

The blade housing overall configuration can be best appreciated from FIG.1, and includes an upper wall 64 from which a depending wall 66 extends. At the front of the blade housing, the wall 66 is beveled at 68 to facilitate entrance of the grass to be cut. The center region 70 of the blade housing is depressed downwardly and is provided with an opening 72 through which the blade clutch mechanism 52 may extend. A plate 73 partially encloses the opening 72.

Radially spaced from the center region of the blade housing, the blade housing is formed to define a convoluted tunnel or air guide channel 74. The "depth" or vertical dimension of the air guide channel 74 gradually increases in the counterclockwise direction, FIG. 1, from the rear portion of the blade housing toward the discharge thereof. The housing 60 is provided with a grass cutting discharge opening 76 which is located on the side of the mower and a discharge opening clearance 78 is defined in the lateral side 24 of the frame 10 to accommodate the blade housing discharge, FIG. 2. As the blade 54 is provided, preferably, with an upturned portion or flange adjacent its trailing edge, a vacuum or suction effect is produced by the blade causing the grass to rise into the path of movement of the cutting edge of the blade. Thus, a considerable amount of air turbulence is created within the blade housing, yet, due to the configuration of the air guide channel 74 and the discharge communicating therewith, a relatively smooth flow of air within the blade housing to the discharge opening 76 is provided. Sufficient velocity of the air and cuttings ejecting from the discharge opening is produced to throw the grass clippings a considerable distance and prevent windrowing.

As will be readily appreciated from FIG. 3, the spacing of the blade housing center portion 70 from the frame deck central region below the engine 44 prevents the transmission from exposure to the cutting area, whereby the operating mechanism will be kept clean and free from grass cuttings and the like.

It will be readily appreciated that as the blade housing 60 completely encases the area of blade movement, any foreign objects struck by the blade and thrown will either leave the discharge opening 76 or strike the blade housing, rather than the frame 10. As the blade housing is formed of a pressed steel sheet metal, it has a high impact resistance to thrown stones, rocks, or the like and, at the worst, will only dent when struck. In this manner, the blade housing protects the frame from thrown objects.

It will also be appreciated that as the blade housing 60 is located substantially below the upper surface 14 of the deck 12, the exterior appearance of the frame 10 from above can be completely independent from any shapes or configurations desired to produce air flow and cutting characteristics in the blade area. As the separate frame and blade housing construction permits these two components to be separately designed a wide variety of frame configurations and contours could be employed in mowers utilizing identical blade housings.

In the disclosed mower embodiments, a novel height adjustment for the front wheels of the mower is employed. The front wheels 36 are rotatably mounted upon a common axle 80. Each of the lateral sides 24 of the frame 10 is provided with a vertically disposed slot 82 defined by a front vertically disposed edge 84 and a rear vertically disposed edge 86. The distance between the edges 84 and 86 is such as to freely receive the axle 80, whereby the axle may be vertically positioned therein as desired. The slots 82 defined on opposite lateral sides of the mower frame are in alignment whereby the axle 80 is perpendicularly disposed to the normal direction of movement of the mower.

A plurality of vertically spaced notches 88 are defined in the slot rear edge 86 and are open to the associated slot, FIG. 4. The dimension of the notches 88 is such as to freely receive the axle 80, whereby the axle may be selectively received in any of the notches. Preferably, the notches 88 are of a "depth" in a rearward direction which is greater than the radial dimension of the axle.

Biasing means in the form of a tension spring 90 is disposed adjacent each of the slots 82 for maintaining the axle within the predetermined notch 88. As shown in FIG. 4, the spring 90 is attached to an anchor pin 92 received within a hole defined in the front wall of the blade housing 60. The other end of the spring 90 is received within a hole 94 defined in the axle.

Adjustment of the front wheels 36 in a vertical direction is accomplished simply by grasping a front wheel 36 and pulling the wheel forwardly. Upon overcoming the tension of the adjacent spring 90, the adjacent axle portion 80 will be removed from its previously associated notch 88 and may be vertically located within the slot 82 for alignment with another notch 88. Release of the wheel in the forward direction permits the spring 90 to pull the axle 80 into the aligned notch and will maintain the axle therein. Similar adjustment of the other front wheel in its associated slot 82 completes the adjustment of the front wheels.

The aforedescribed wheel adjustment is very economical, in that the slots and notches are formed in the material of the frame, itself, and require no additional bracket or other apparatus. It is preferable to form the notches 88 in the slot rear edge 86, in that forward movement of the mower will also tend to keep the axle within the desired notch.

It is understood that various modifications to the inventive concepts may be apparent to those skilled in the art without departing from the spirit and scope thereof, for instance, the blade housing 60 could be formed of an impact resistant, synthetic plastic material, rather than sheet metal, and it is intended that the invention be defined only by the following claims.

What is claimed is:

1. A rotary lawn mower comprising, in combination,
   (a) a frame having a front, a rear and including a deck,
   (b) ground wheels rotatably mounted upon said frame for the support thereof,
   (c) a motor mounted upon said frame,
   (d) a blade-supporting shaft rotatably mounted on said frame having a lower end extending below said deck,
   (e) a cutting blade mounted on said shaft lower end,
   (f) a blade housing affixed to said frame and located below said deck, said blade housing including an upper wall and a downwardly extending wall depending from said upper wall terminating in a lower edge, said upper wall projecting over the area of blade movement and said downwardly extending wall substantially encompassing said blade in the plane of blade rotation,
   (g) an air-guiding channel defined in said blade housing upper wall, and
   (h) a discharge opening defined in said blade housing communicating with said air-guiding channel.

2. A rotary lawn mower comprising, in combination,
   (a) a frame having a front, a rear and including a deck,
   (b) ground wheels rotatably mounted upon said frame for the support thereof,
   (c) a motor mounted on said frame deck and including a drive shaft having a lower end extending below said deck,
   (d) a cutting blade mounted on said drive shaft lower end and defining an area of blade movement during rotation,
   (e) a formed blade housing affixed to said frame below said deck and disposed over said area of blade movement, said blade housing including an upper wall and a downwardly extending wall depending from said upper wall terminating in a lower edge, said upper wall projecting over the area of blade movement and said downwardly extending wall substantially encompassing said blade in the plane of blade rotation,
   (f) an air-guiding channel defined in said blade housing upper wall, and
   (g) an outlet defined in said blade housing in communication with said air-guiding channel.

3. A rotary lawn mower comprising, in combination,
   (a) a cast frame having a front, a rear and including a deck,
   (b) ground wheels rotatably mounted upon said frame for the support thereof,
   (c) a motor mounted on said frame deck and including a drive shaft having a lower end extending below said deck,
   (d) a cutting blade mounted on said drive shaft lower end and defining an area of blade movement during rotation, and
   (e) a sheet metal blade housing affixed to said frame below said deck and disposed over said area of blade movement, said blade housing including an upper wall and a downwardly extending wall depending from said upper wall terminating in a lower edge, said upper wall projecting over the area of blade movement and said downwardly extending wall substantially encompassing said blade in the plane of blade rotation.

4. A rotary lawn mower comprising, in combination,
   (a) a cast frame having a central region, a front, a rear and including a deck,
   (b) ground wheels rotatably mounted upon said frame for the support thereof,
   (c) a motor mounted on said frame deck at said central region and including a drive shaft having a lower end extending below said deck,
   (d) a cutting blade mounted on said drive shaft lower end and defining an area of blade movement during rotation,
   (e) a pressed steel blade housing affixed to said frame central region below said deck and disposed over said area of blade movement, said blade housing including an upper wall and a downwardly extending wall depending from said upper wall terminating in a lower edge, said upper wall projecting over the area of blade movement and said downwardly extending wall substantially encompassing said blade in the plane of blade rotation,
   (f) an air-guiding channel defined in said blade housing upper wall, and
   (g) an outlet defined in said blade housing in communication with said air-guiding channel.

5. In a rotary lawn mower as in claim 4 wherein:
   (a) said blade housing upper wall includes a center portion, said drive shaft extending through said center portion, said center portion being spaced from and below said frame central region adjacent said motor drive shaft.

6. A lawn mower comprising, in combination,
   (a) a primary substantially rigid frame including a deck having upper and lower surfaces,
   (b) ground wheels rotatably mounted upon said frame for the support thereof,
   (c) a motor mounted on the upper surface of said deck in driving connection with a rotatable drive shaft having a lower end extending below said deck,
   (d) a cutting blade mounted on said drive shaft lower end and defining an area of blade movement during rotation,
   (e) a formed high-impact resistant blade housing affixed to said frame below said deck lower surface and disposed over said area of blade movement, said blade housing including an upper wall and a downwardly extending wall depending from said upper wall terminating in a lower edge, said upper wall projecting over the area of blade movement and said downwardly extending wall substantially encompassing said blade in the plane of blade rotation, and
   (f) a discharge opening defined in said blade housing.

7. In a lawn mower as in claim 6 wherein:
   (a) an air-guiding channel is defined in said blade housing upper wall, said discharge opening communicating with said channel.

8. A rotary lawn mower comprising, in combination,
   (a) a frame having a front, a rear and including a deck, (b) ground wheels rotatably mounted upon said frame for the support thereof,
(c) a motor mounted upon said frame,
(d) a blade-supporting shaft rotatably mounted on said frame having a lower end extending below said deck,
(e) a cutting blade mounted on said shaft lower end, said blade including cutting ends,
(f) a blade housing affixed to said frame and located below said deck, said blade housing including an upper wall and a downwardly extending wall depending from said upper wall terminating in a lower edge, said upper wall projecting over the area of blade movement and said downwardly extending wall substantially encompassing said blade in the plane of blade rotation, said lower edge being a greater distance from the axis of blade rotation than said blade cutting ends,
(g) an air-guiding channel defined in said blade housing upper wall, and
(h) a discharge opening defined in said blade housing communicating with said air-guiding channel.

9. A rotary lawn mower comprising, in combination,
(a) a frame comprising an outer housing defining the general appearance of the mower frame,
(b) ground wheels rotatably mounted upon said frame for the support thereof,
(c) a motor mounted upon said frame,
(d) a blade-supporting shaft rotatably mounted on said frame extending below said frame,
(e) a cutting blade mounted on said shaft lower end,
(f) a blade housing affixed to the underside of said frame, said blade housing adapted to confine said blade in the upward and radial directions and protect said frame from cuttings and objects impelled by said blade and being of a configuration to provide efficient air flow above said blade, said blade housing including an upper wall and a downwardly extending wall depending from said upper wall terminating in a lower edge, said upper wall projecting over the area of blade movement and said downwardly extending wall substantially encompassing said blade in the plane of blade rotation,
(g) an air-guiding channel defined in said blade housing upper wall, and
(h) a discharge opening defined in said blade housing communicating with said air-guiding channel.

References Cited by the Examiner

UNITED STATES PATENTS

| | | | |
|---|---|---|---|
| 2,825,196 | 3/1958 | Gudmundsen | 56—25.4 |
| 3,056,249 | 10/1962 | Shaw | 56—25.4 |
| 3,091,906 | 6/1963 | Hall | 56—25.4 |
| 3,134,212 | 5/1964 | Gary | 56—25.4 |
| 3,138,910 | 6/1964 | Price et al. | 56—25.4 |

ABRAHAM G. STONE, *Primary Examiner.*

RUSSELL R. KINSEY, *Examiner.*

Disclaimer 3,299,622.—*Rudolph A. Hanson* and *Frank J. Deptula,* Jackson, Mich. ROTARY DISC MOWER WITH SEPARATE FRAME AND BLADE HOUSING STRUCTURE. Patent dated Jan. 24, 1967. Disclaimer filed Dec. 23, 1968, by the assignee, *Yard-Man, Inc.*

Hereby enters this disclaimer to claims 1, 2, 8 and 9 of said patent.

[*Official Gazette April 29, 1969.*]